United States Patent
Ando

(10) Patent No.: US 12,106,927 B2
(45) Date of Patent: Oct. 1, 2024

(54) X-RAY GENERATION APPARATUS, X-RAY IMAGING APPARATUS, AND ADJUSTMENT METHOD OF X-RAY GENERATION APPARATUS

(71) Applicant: CANON ANELVA CORPORATION, Kawasaki (JP)

(72) Inventor: Yoichi Ando, Inagi (JP)

(73) Assignee: Canon Anelva Corporation, Kawasaki (JP)

( * ) Notice: Subject to any disclaimer, the term of this patent is extended or adjusted under 35 U.S.C. 154(b) by 0 days.

(21) Appl. No.: 18/509,608

(22) Filed: Nov. 15, 2023

(65) Prior Publication Data
US 2024/0087833 A1 Mar. 14, 2024

Related U.S. Application Data

(63) Continuation of application No. PCT/JP2023/010620, filed on Mar. 17, 2023.

(30) Foreign Application Priority Data

Mar. 31, 2022 (WO) .................. PCT/JP2022/016710

(51) Int. Cl.
*H01J 35/14* (2006.01)
*H01J 35/08* (2006.01)
(Continued)

(52) U.S. Cl.
CPC ........... *H01J 35/153* (2019.05); *H01J 35/116* (2019.05); *H01J 35/16* (2013.01); *H01J 35/24* (2013.01); *G01N 23/046* (2013.01); *H01J 35/112* (2019.05)

(58) Field of Classification Search
CPC ........ H01J 35/153; H01J 35/116; H01J 35/16; H01J 35/24
See application file for complete search history.

(56) References Cited

U.S. PATENT DOCUMENTS 4,048,496 A * 9/1977 Albert .................. G01N 23/223
378/45
5,703,926 A 12/1997 Bischof
(Continued)

FOREIGN PATENT DOCUMENTS

JP H04138645 A 5/1992
JP H1012169 A 1/1998
(Continued)

OTHER PUBLICATIONS

Kusch, Jochen, DE 19860115 A1 and its English translation (Year: 2000).*
(Continued)

*Primary Examiner* — Chih-Cheng Kao
(74) *Attorney, Agent, or Firm* — Buchanan Ingersoll & Rooney PC

(57) ABSTRACT

An X-ray imaging apparatus includes an X-ray generation apparatus including an X-ray generation tube having an electron gun and a target configured to receive an electron beam from the electron gun to generate X-rays, a support structure supporting the tube, and a deflector configured to deflect the electron beam, an X-ray detector configured to detect the X-rays from the X-ray generation apparatus, and a control apparatus configured to control the X-ray generation apparatus. The support structure supports the tube to permit at least the target to be pivoted in a state in which the deflector is fixed, and the control apparatus determines, based on use amount of the X-ray generation apparatus and/or change of the X-rays generated by the X-ray generation apparatus, whether it is necessary to pivot the target.

25 Claims, 8 Drawing Sheets

(51) Int. Cl.
   *H01J 35/16*   (2006.01)
   *H01J 35/24*   (2006.01)
   *G01N 23/046*  (2018.01)

(56) References Cited

U.S. PATENT DOCUMENTS

| | | | |
|---|---|---|---|
| 5,857,008 | A | 1/1999 | Reinhold |
| 2015/0380201 | A1 | 12/2015 | Yoshizawa |
| 2017/0338077 | A1 | 11/2017 | Tsujino et al. |
| 2017/0372865 | A1 | 12/2017 | Ishihara et al. |
| 2018/0182590 | A1 | 6/2018 | Ohashi |
| 2020/0058462 | A1 | 2/2020 | Suzuki |
| 2021/0217574 | A1 | 7/2021 | Nonoguchi et al. |

FOREIGN PATENT DOCUMENTS

| | | |
|---|---|---|
| JP | H10503618 A | 3/1998 |
| JP | 2000277042 A | 10/2000 |
| JP | 4309176 B2 | 8/2009 |
| JP | 2009301911 A | 12/2009 |
| JP | 2014154485 A | 8/2014 |
| JP | 2016162525 A | 9/2016 |
| JP | 2017016921 A | 1/2017 |
| JP | 2017212054 A | 11/2017 |
| JP | 2018190525 A | 11/2018 |
| JP | 2020053217 A | 4/2020 |
| WO | 2014125702 A1 | 8/2014 |

OTHER PUBLICATIONS

Abu, Hideo, JP 2009-043651 and its English translation (Year: 2009).*

Frederic et al., FR 2879809 A1 and its English translation (Year: 2006).*

International Search Report (PCT/ISA/210) with translation and Written Opinion (PCT/ISA/237) mailed on May 23, 2023 by the Japanese Patent Office as the International Searching Authority for International Application No. PCT/JP2023/010620. (9 pages).

Notice of Opposition and Evidence Statement of Registration issued on Feb. 9, 2024, by the Japanese Patent Office in corresponding Japanese Patent No. 7337312, with an English translation. (62 pages).

Office Action (Written Notice of Reasons for Revocation) from Japanese Opposition No. 2024-700118 issued on Jun. 11, 2024, by the Japanese Patent Office in corresponding Japanese Patent No. 7337312, and an English Translation of the Office Action. (30 pages).

* cited by examiner

FIG. 1
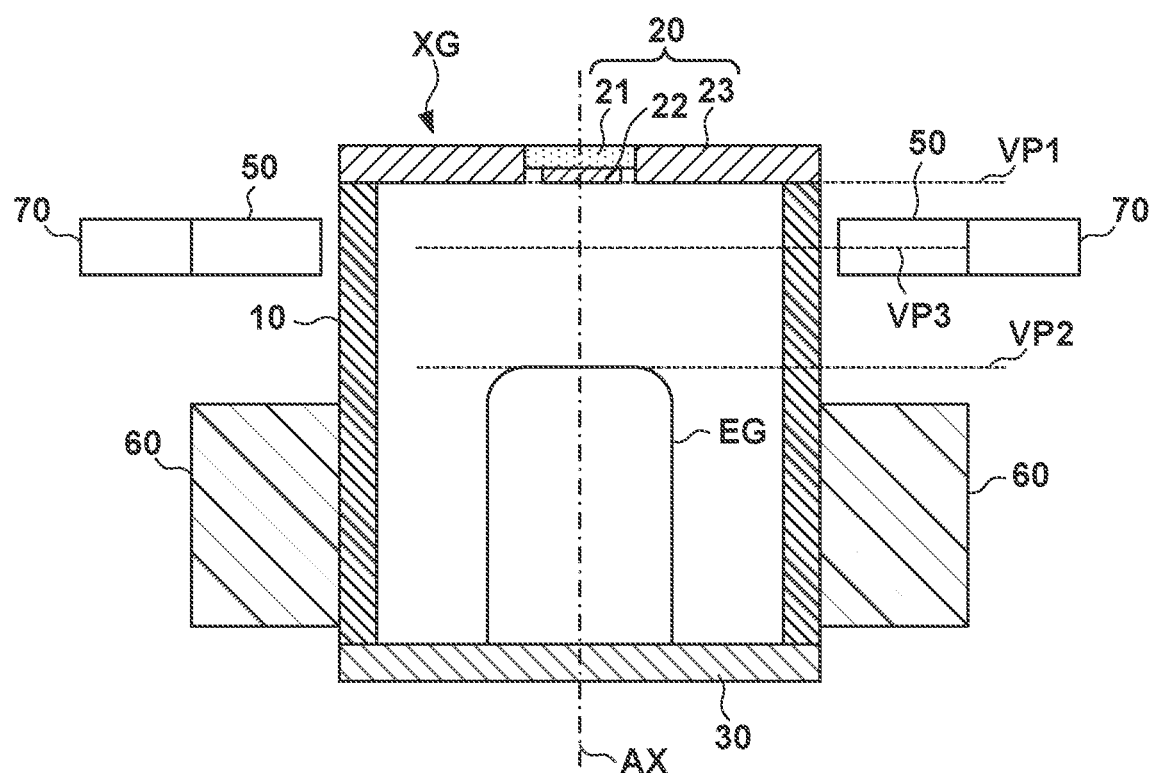
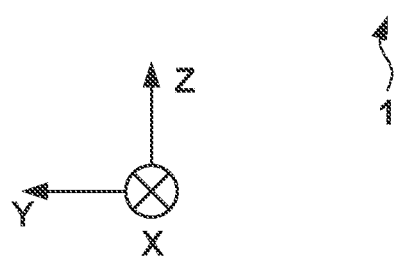

X-RAY GENERATION APPARATUS, X-RAY IMAGING APPARATUS, AND ADJUSTMENT METHOD OF X-RAY GENERATION APPARATUS

CROSS-REFERENCE TO RELATED APPLICATIONS

This application is a Continuation of International Patent Application No. PCT/JP2023/010620, filed Mar. 17, 2023, which claims the benefit of International Patent Application No. PCT/JP2022/016710, filed Mar. 31, 2022, both of which are hereby incorporated by reference herein in their entirety.

BACKGROUND OF THE INVENTION

Field of the Invention

The present invention relates to an X-ray generation apparatus, an X-ray imaging apparatus, and an adjustment method of the X-ray generation apparatus.

Background Art

In a transmission type microfocus X-ray tube, a target is irradiated with an electron beam to generate X-rays. However, in such X-ray tube, heat is generated by irradiating a target with an electron beam, and thus the target readily degrades.

Japanese Patent No. 4309176 describes a technique in which a magnet portion is arranged around an X-ray generation tube bulb, and the irradiation position of an electron beam on a target is changed by rotating the magnet portion, thereby prolonging the life of the X-ray generation tube bulb. However, if the irradiation position of the electron beam on the target is changed by moving the magnet portion, as described in Japanese Patent No. 4309176, the emission position of X-rays from an X-ray generation apparatus, that is, the focus position is changed. Therefore, every time the magnet portion is moved, that is, every time the focus position is changed, it is necessary to align an X-ray detector for detecting the X-rays emitted from the X-ray generation apparatus.

SUMMARY OF THE INVENTION

The present invention provides a technique advantageous in prolonging the life of a target or an X-ray generation tube without changing a focus position.

A first aspect of the present invention is directed to an X-ray imaging apparatus, and the X-ray imaging apparatus comprises: an X-ray generation apparatus including an X-ray generation tube that includes an electron gun and a target configured to receive an electron beam emitted from the electron gun to generate X-rays, a support structure configured to support the X-ray generation tube, and a deflector configured to deflect the electron beam; an X-ray detector configured to detect the X-rays emitted from the X-ray generation apparatus; and a control apparatus configured to control the X-ray generation apparatus. The support structure supports the X-ray generation tube so as to permit at least the target to be pivoted in a state in which the deflector is fixed. The control apparatus determines, based on a use amount of the X-ray generation apparatus and/or a change of the X-rays generated by the X-ray generation apparatus, whether it is necessary to pivot the target.

A second aspect of the present invention is directed to an adjustment method of an X-ray generation apparatus, and the X-ray generation apparatus includes an X-ray generation tube that includes an electron gun and a target configured to receive an electron beam emitted from the electron gun to generate X-rays, a support structure configured to support the X-ray generation tube, and a deflector configured to deflect the electron beam. The method comprises: a pivot step of pivoting at least the target, in a state in which the deflector is fixed, in accordance with a use amount of the X-ray generation apparatus and/or a change of the X-rays generated by the X-ray generation apparatus.

A third aspect of the present invention provides an X-ray generation apparatus, and the X-ray generation apparatus comprises: an X-ray generation tube including an electron gun and a target configured to receive an electron beam emitted from the electron gun to generate X-rays; a support structure configured to support the X-ray generation tube; and a deflector configured to deflect the electron beam. The target has a circular shape, and is formed from a single metal or a single alloy, and the support structure supports the X-ray generation tube so as to permit at least the target to be pivoted about a pivot axis coinciding with a center axis of the electron gun in a state in which the deflector is fixed.

Further features of the present invention will become apparent from the following description of exemplary embodiments with reference to the attached drawings.

BRIEF DESCRIPTION OF DRAWINGS

FIG. 1 is a view schematically showing the arrangement of an X-ray generation apparatus according to the first embodiment;

DESCRIPTION OF THE EMBODIMENTS

Figure 2:
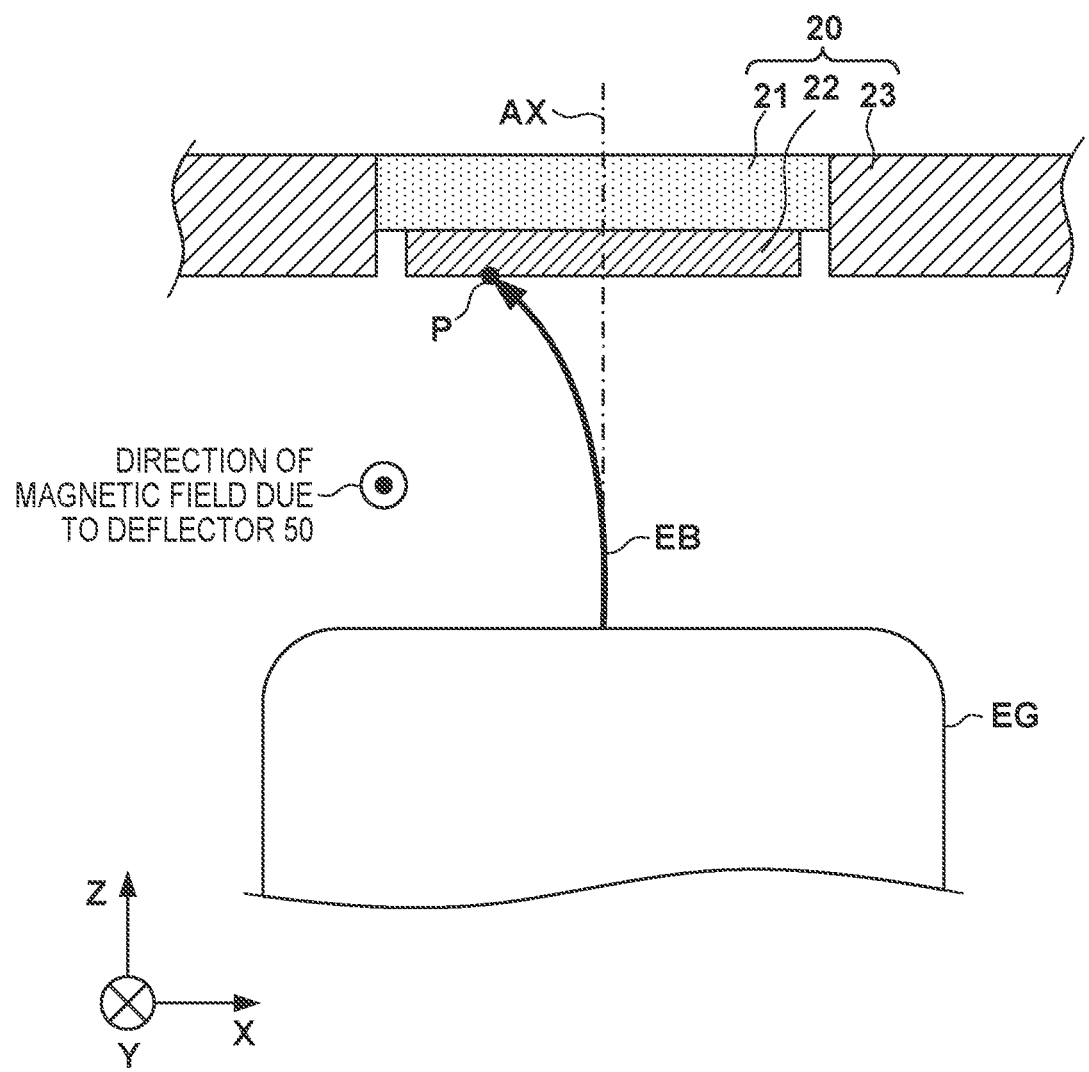
FIG. 2 is a view schematically showing a state in which an electron beam emitted from an electron gun collides against a target in the X-ray generation apparatus according to the first embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

FIG. 1 schematically shows the arrangement of an X-ray generation apparatus 1 according to the first embodiment. The X-ray generation apparatus 1 can be formed as a transmission type X-ray generation apparatus. The X-ray generation apparatus 1 includes an X-ray generation tube XG. The X-ray generation tube XG can include an electron gun EG and a target 22 that receives an electron beam or electrons emitted from the electron gun EG to generate X-rays. In an example, the X-ray generation tube XG can include an insulating tube 10 with two opening ends, an anode 20 that closes one of the two opening ends of the insulating tube 10, and a closing member 30 that closes the other of the two opening ends of the insulating tube 10. The anode 20 can include the target 22, a target holding plate 21 that holds the target 22, and an electrode 23 that applies a potential to the target 22 via the target holding plate 21 while supporting the target holding plate 21. The closing member 30 can be configured to hold the electron gun EG. The insulating tube 10, the anode 20, and the closing member 30 can form a container that defines an enclosed space. The enclosed space can be maintained at a vacuum or a high degree of vacuum.

The X-ray generation apparatus 1 can further include a tube support structure 60 that supports the X-ray generation tube XG, and a deflector 50 that deflects the electron beam emitted from the electron gun EG. In addition, the X-ray generation apparatus 1 can include a deflector support structure 70 that supports the deflector 50. The tube support structure 60 can support the X-ray generation tube XG so as to permit at least the target 22 to be pivoted in a state in which the deflector 50 is fixed. From another viewpoint, the tube support structure 60 can support the X-ray generation tube XG so as to permit the X-ray generation tube XG to be pivoted in a state in which the deflector 50 is fixed. From still another viewpoint, the tube support structure 60 can support the X-ray generation tube XG so as to permit the X-ray generation tube XG to be pivoted in a state in which the deflector 50 is supported by the deflector support structure 70. The tube support structure 60 and the deflector support structure 70 are structures that individually support the X-ray generation tube XG and the deflector 50. For example, the X-ray generation tube XG may be pivoted manually by an operator or the like or may be pivoted by a driving mechanism (not shown).

The deflector 50 can be arranged outside the X-ray generation tube XG. The deflector 50 can be arranged so that, for example, a virtual plane VP3 crossing the deflector 50 is located between a virtual plane VP1 including the electron beam incident surface of the target 22 (the surface facing the electron gun EG) and a virtual plane VP2 including the distal end face (the surface on the side of the target 22) of the electron gun EG. The virtual planes VP1, VP2, and VP3 can be defined as planes vertically intersecting a center axis AX of the electron gun EG. The deflector 50 deflects the electron beam emitted from the electron gun EG by exerting a magnetic field on the electron beam. When the deflector 50 deflects the electron beam, the incident position of the electron beam on the target 22 can be adjusted or shifted.

The deflector 50 may be formed from a permanent magnet, an electromagnet, or a permanent magnet and an electromagnet. In an example, the deflector 50 can include a first magnet and a second magnet. The first magnetic pole (for example, the S-pole) of the first magnet and the second magnetic pole (for example, the N-pole) of the second magnet can be arranged to face each other via the insulating tube 10 or the X-ray generating tube XG. The deflector 50 may be formed from one magnet arranged such that its magnetic pole faces in the radial direction of the insulating tube 10 or the X-ray generating tube XG. The deflector 50 may detachably be supported by the deflector support structure 70. The deflector support structure 70 may include a driving mechanism that moves and/or rotates the deflector 50 or an adjustment mechanism that adjusts the position or orientation of the deflector 50. By providing such driving mechanism or adjustment mechanism, it is possible to adjust the magnetic field exerted on the electron beam emitted from the X-ray generation tube XG.

The electrode 23 is electrically connected to the target 22 and applies a potential to the target 22. When electrons from the electron gun EG collide against the target 22, the target 22 generates X-rays. The X-rays generated by the target 22 are transmitted through the target holding plate 21 and emitted outside the X-ray generating tube XG. The anode 20 can be maintained at, for example, the ground potential but may be maintained at another potential. The target 22 may have a circular shape and may be formed from a single metal or a single alloy. The single metal may contain a small amount of unintended impurity. The single alloy is a metal material obtained by mixing one or more kinds of other elements with a pure metal. From another viewpoint, the target 22 may have an axisymmetric structure and may be formed from a single metal or single alloy. The target 22 is desirably formed from a material having a high melting point, for example, tungsten, tantalum, or molybdenum. These materials are advantageous in improving the generation efficiency of X-rays. The target holding plate 21 can be formed from, for example, a material that can easily transmit X-rays, such as beryllium or diamond.

FIG. 2 schematically shows a state in which an electron beam EB emitted from the electron gun EG collides against the target 22. Referring to FIG. 2, the electron gun EG and the target 22 are close to each other. However, the electron gun EG and the target 22 can be arranged further separated from each other. The electron beam EB emitted from the electron gun EG enters or collides against the target 22 after being deflected by the magnetic field generated by the deflector 50. The amount by which the electron beam EB is deflected, in other words, the incident position of the electron beam EB on the target 22 can depend on the magnetic field generated by the deflector 50 and the accelerating voltage of the electron gun EG.

Figure 3:
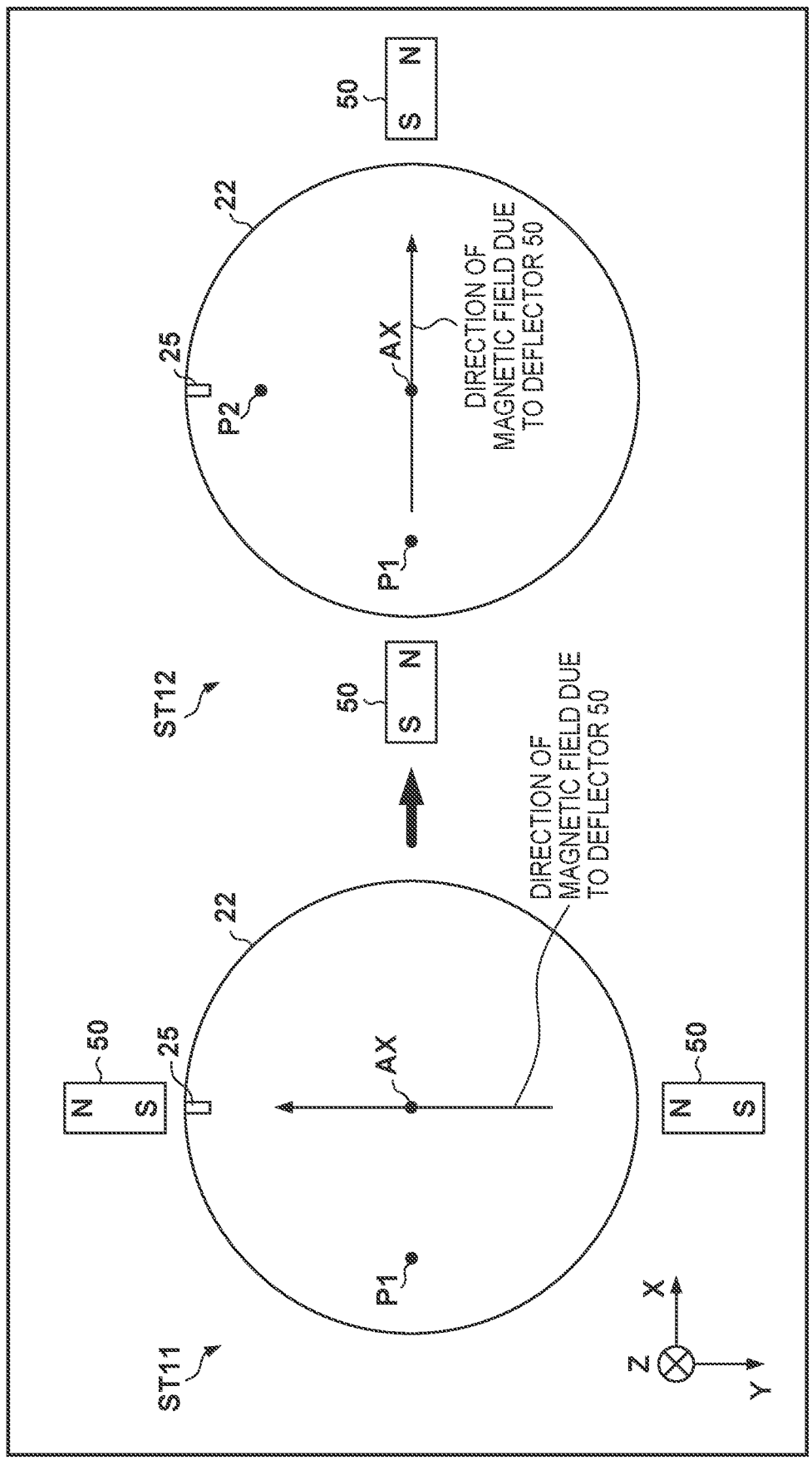
FIG. 3 is a view schematically showing an adjustment method or a use method of an X-ray generation apparatus according to a comparative example.

FIG. 3 schematically shows two states ST11 and ST12 of an X-ray generation apparatus according to a comparative example. Either of the two states ST11 and ST12 shows a state when viewing a target 22 from the side of an electron gun EG. In the state ST11, the electron beam emitted from the electron gun EG is deflected by the magnetic field generated by a deflector 50, and enters a position P1 of the target 22. The state ST12 is a state in which the deflector 50 is pivoted with respect to the arrangement of the deflector 50 in the state ST11. Therefore, a position P2 at which the electron beam enters the target 22 in the state ST12 is a position obtained by pivoting, about a center axis AX, the position P1 at which the electron beam enters the target 22 in the state ST11. That is, in the comparative example, the position at which the electron beam enters the target 22 is changed from the position P1 to the position P2 by pivoting the deflector 50. In the comparative example, this can prolong the life of the target 22 or an X-ray generation apparatus 1. However, when the position at which the electron beam enters the target 22 is changed from the position P1 to the position P2, this means that the position at which the target 22 emits X-rays, that is, the focus position of the X-rays in the X-ray inspection apparatus is changed. Therefore, in the comparative example, when the position at which the electron beam enters the target 22 is changed by the pivot of the deflector 50, it is necessary to adjust the position of the X-ray detector.

Figure 4:
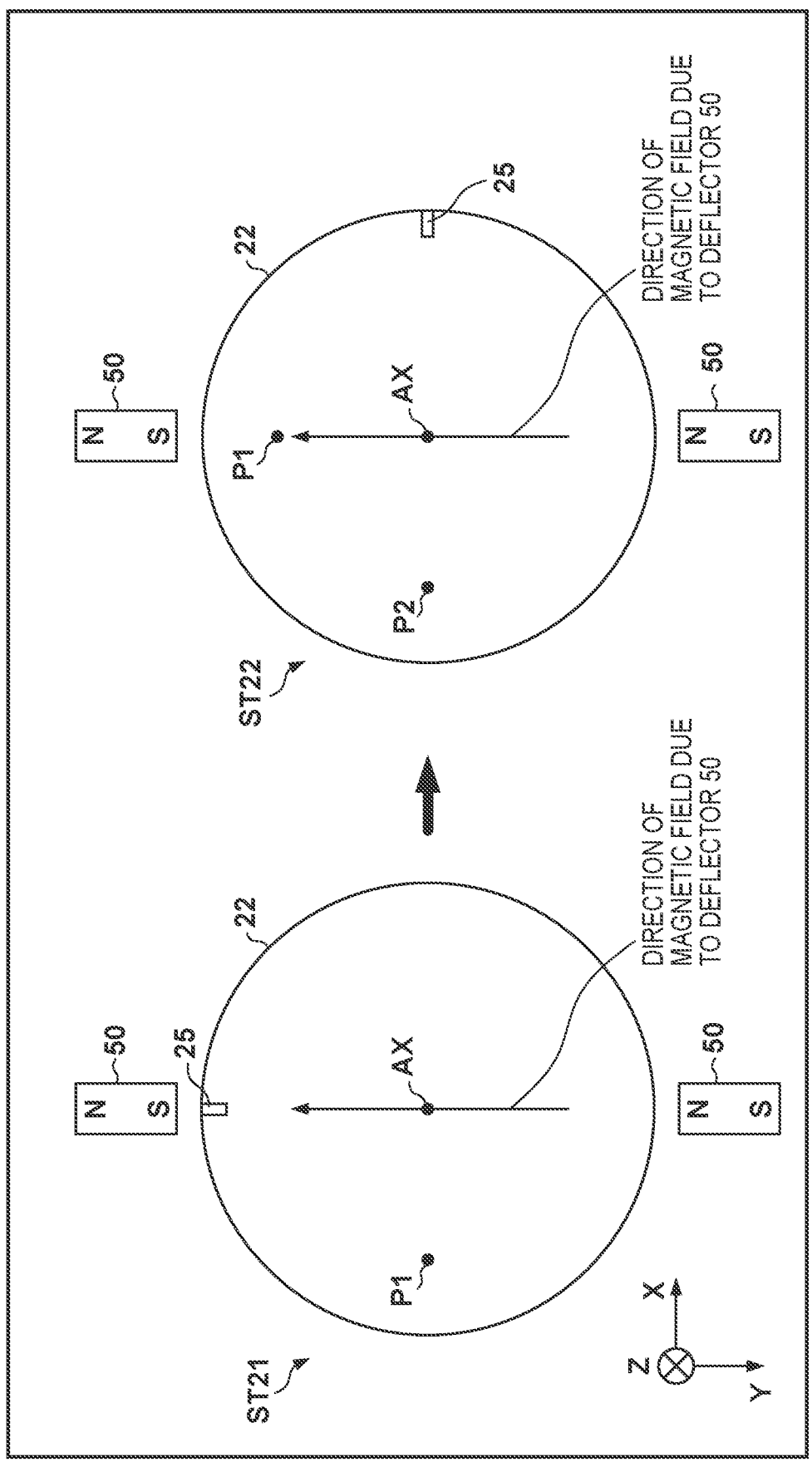
FIG. 4 is a view schematically showing an adjustment method or a use method of the X-ray generation apparatus according to the first embodiment.

FIG. 4 schematically shows two states ST21 and ST22 of the X-ray generation apparatus 1 according to the first embodiment. Either of the two states ST21 and ST22 shows a state when viewing the target 22 from the side of the electron gun EG. In the state ST21, the electron beam emitted from the electron gun EG is deflected by the magnetic field generated by the deflector 50, and enters a position P1 of the target 22. In the state ST22, the X-ray generation tube XG (target 22) is pivoted with respect to the azimuth of the X-ray generation tube XG (target 22) in the state ST21, and the electron beam enters a position P2 of the target 22. In this example, the pivot angle of the target 22 is 90° but the pivot angle can arbitrarily be set. For example, in consideration of the deflection of the electron beam, the damage range on the target 22 caused by the incidence of the electron beam, and the like, a pivot angle of 3° or more is desirable. In consideration of the pivot accuracy and a change in incident position of the electron beam, a pivot angle of 10° or more is more desirable. Reference numeral 25 denotes a virtual azimuth mark given to the target 22. In the first embodiment, the X-ray generation tube XG (target 22) is pivoted in a state in which the deflector 50 is fixed. Therefore, the electron beam enters the different positions P1 and P2 of the target 22 in the states ST21 and ST22, respectively. However, the positions P1 and P2 viewed from the X-ray detector, that is, the positions P1 and P2 in the space where the X-ray generation apparatus 1 is arranged are the identical positions. This can prolong the life of the target 22 or the X-ray generation apparatus 1 without changing the positions P1 and P2 in the space where the X-ray generation apparatus 1 is arranged, that is, the focus position.

As is apparent from the above description, an adjustment method of the X-ray generation apparatus 1 according to the embodiment includes a pivot step of pivoting the X-ray generation tube XG in a state in which the deflector 50 is fixed. The pivot step can be executed in accordance with the use amount of the X-ray generation apparatus 1. The use amount can be, for example, at least one of the use time of the X-ray generation apparatus 1, a power amount applied to the electrode 23, and the cumulative value of the X-rays generated by the X-ray generation apparatus 1. Alternatively, the pivot step can be executed in accordance with the change of the X-rays generated by the X-ray generation apparatus 1. For example, the pivot step can be executed when the intensity of the X-rays generated by the X-ray generation apparatus 1 becomes lower than a predetermined percentage of the intensity of the X-rays generated by the X-ray generation apparatus 1 immediately after the last pivot step is executed.

The tube support structure 60 can support the X-ray generation tube XG so as to permit the X-ray generation tube XG to be pivoted about a pivot axis coinciding with the center axis AX of the electron gun EG. The center axis AX of the electron gun EG can be arranged to pass through the center of the target 22. In a case where the electron beam EB is not deflected by the deflector 50, the electron beam EB can enter the center of the target 22.

Figure 5:
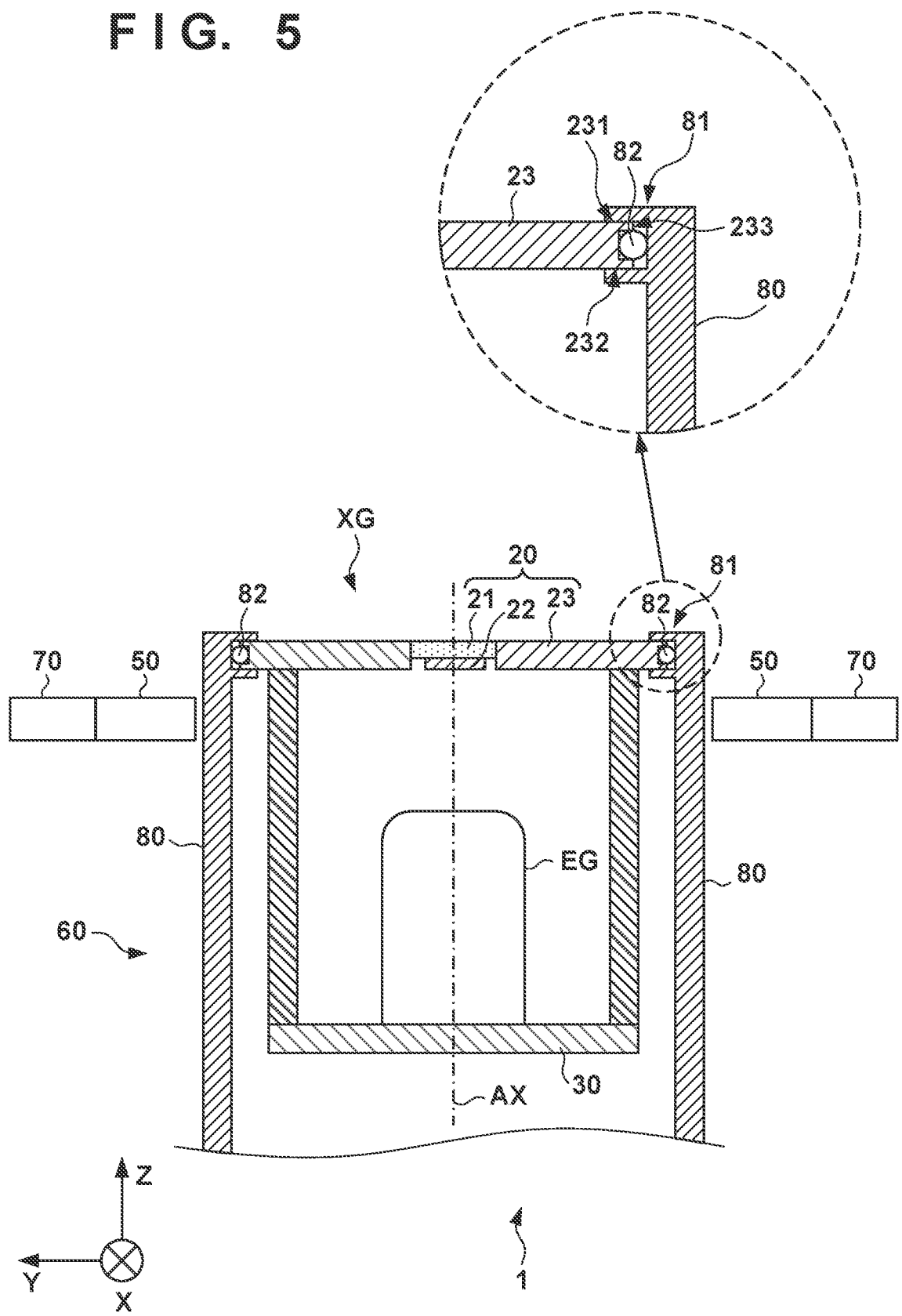
FIG. 5 is a view schematically showing the arrangement of an X-ray generation apparatus according to the second embodiment.

FIG. 5 schematically shows the arrangement of an X-ray generation apparatus 1 according to the second embodiment. Matters not mentioned as the X-ray generation apparatus 1 of the second embodiment can comply with the first embodiment. In the second embodiment, a tube support structure 60 includes a storage portion 80 that surrounds an X-ray generation tube XG. The storage portion 80 can support the X-ray generation tube XG so as to permit the X-ray generation tube XG to be pivoted in a state in which a deflector 50 is fixed. An insulating fluid (for example, insulating oil) is filled or arranged in a space between the X-ray generation tube XG and the storage portion 80. The X-ray generation apparatus 1 may include an O-ring 82, and the X-ray generation tube XG and the storage portion 80 can have seal surfaces facing each other via the O-ring 82.

The storage portion 80 may include a seal portion 81. The seal portion 81 can include a concave portion that covers a first surface 231 and a second surface 232 on the opposite sides in the outer peripheral portion of the electrode 23 of the anode 20, and an end face 233 of the peripheral portion. The O-ring 82 can be arranged to contact the end face 233 or arranged in the concave portion formed in the end face 233. A deflector support structure 70 that supports the deflector 50 can be connected to the storage portion 80.

Figure 6:
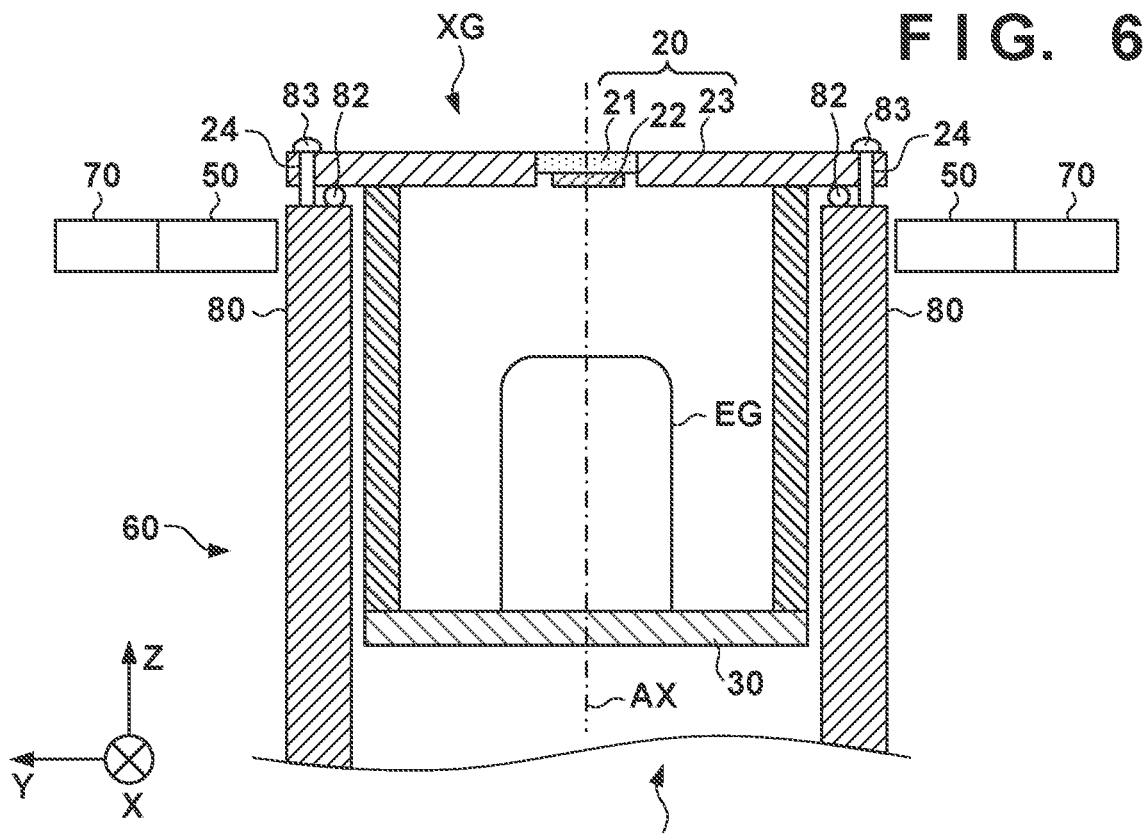
FIG. 6 is a view schematically showing the arrangement of an X-ray generation apparatus according to the third embodiment.

FIG. 6 schematically shows the arrangement of an X-ray generation apparatus 1 according to the third embodiment. Matters not mentioned as the X-ray generation apparatus 1 of the third embodiment can comply with the first or second embodiment. In the third embodiment, a through hole 24 can be formed in an electrode 23. An O-ring 82 can be arranged between the upper surface of a storage portion 80 and the lower surface of the electrode 23. The electrode 23 (an anode 20) can be fixed to the storage portion 80 by a screw 83 extending through the through hole 24. For example, the through hole 24 can be formed as a long hole so as to permit the pivot of an X-ray generation tube XG with respect to a tube support structure 60. When loosening the screw 83 to pivot the X-ray generation tube XG, a torque can be managed not to lose the seal by the O-ring 82. Alternatively, the rotation angle of the screw 83 can be limited to a predetermined angle or smaller so the seal by the O-ring 82 is not lost when loosening the screw 83 to pivot the X-ray generation tube XG.

Figure 7:
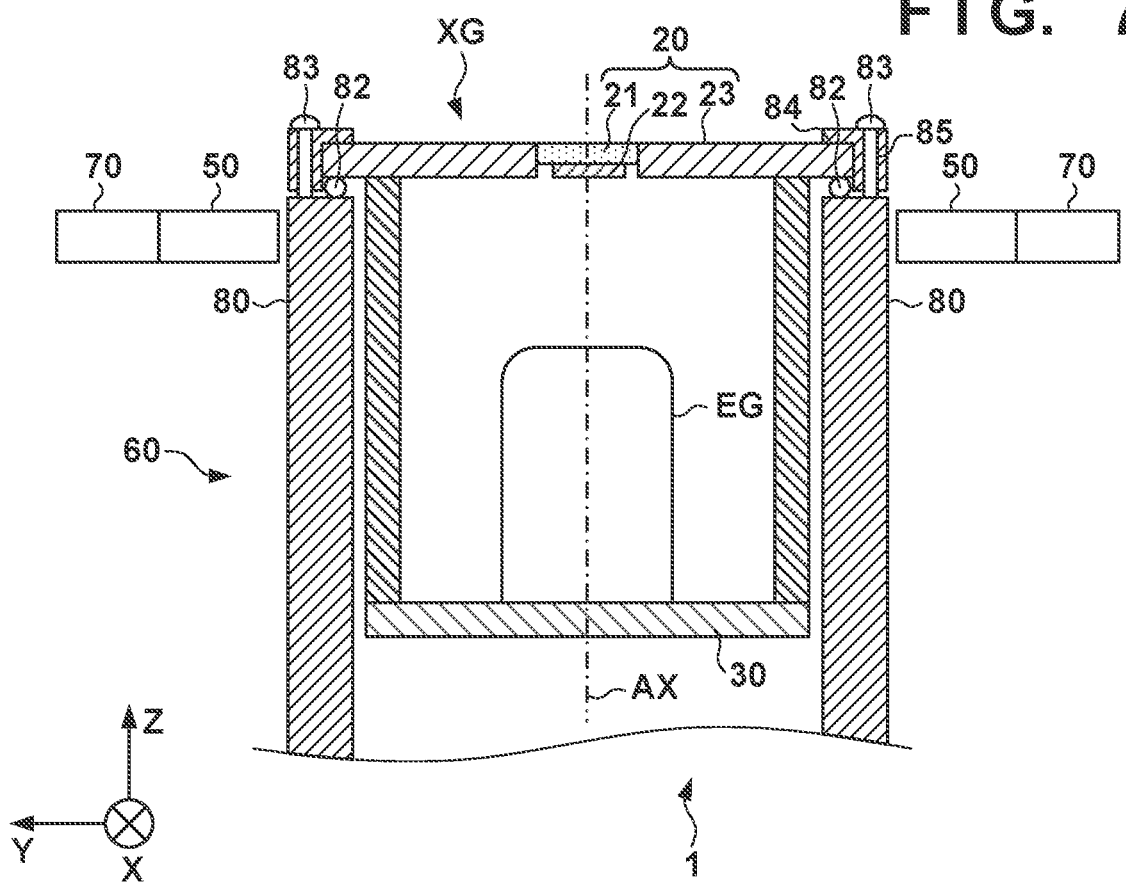
FIG. 7 is a view schematically showing the arrangement of an X-ray generation apparatus according to the fourth embodiment.

FIG. 7 schematically shows the arrangement of an X-ray generation apparatus 1 according to the fourth embodiment. Matters not mentioned as the X-ray generation apparatus 1 of the fourth embodiment can comply with the third embodiment. In the fourth embodiment, a regulation member 84 that regulates the position of an electrode 23 may be provided. The regulation member 84 can have, for example, a ring shape. A through hole 85 can be formed in the regulation member 84. An O-ring 82 can be arranged between the upper surface of a storage portion 80 and the lower surface of the electrode 23. The regulation member 84 can be fixed to the storage portion 80 by pressing the electrode 23 against the O-ring 82 by a screw 83 extending through the through hole 85. For example, the through hole 85 can be formed as a long hole so as to permit the pivot of an X-ray generation tube XG with respect to a tube support structure 60.

Figure 8:
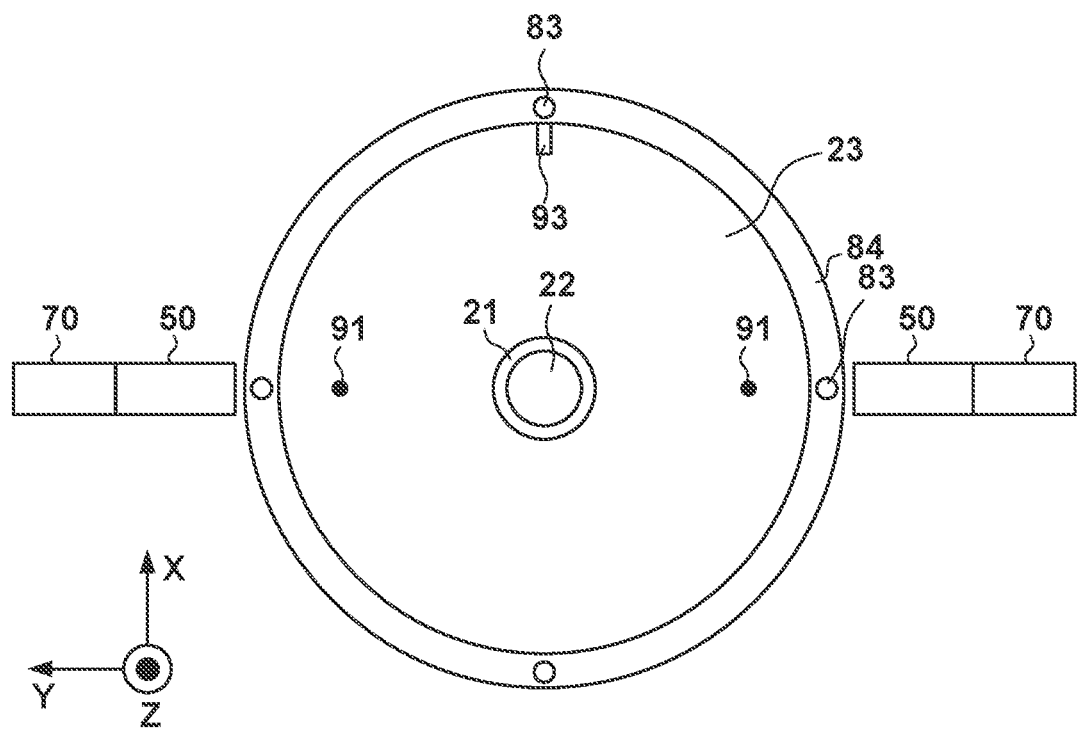
FIG. 8 is a view schematically showing the arrangement of an X-ray generation apparatus according to the fifth embodiment.

FIG. 8 schematically shows the arrangement of an X-ray generation apparatus 1 according to the fifth embodiment. Matters not mentioned as the X-ray generation apparatus 1 of the fifth embodiment can comply with the first to fourth embodiments. The X-ray generation apparatus 1 can include a mark 93 representing the pivot angle of an X-ray generation tube XG with respect to a tube support structure 60. The X-ray generation apparatus 1 may include an engaging portion 91 that engages with a jig (not shown) to pivot the X-ray generation tube XG. An operator can engage the jig with engaging portion 91, and operate the jig, thereby pivoting the X-ray generation tube XG.

Figure 9:
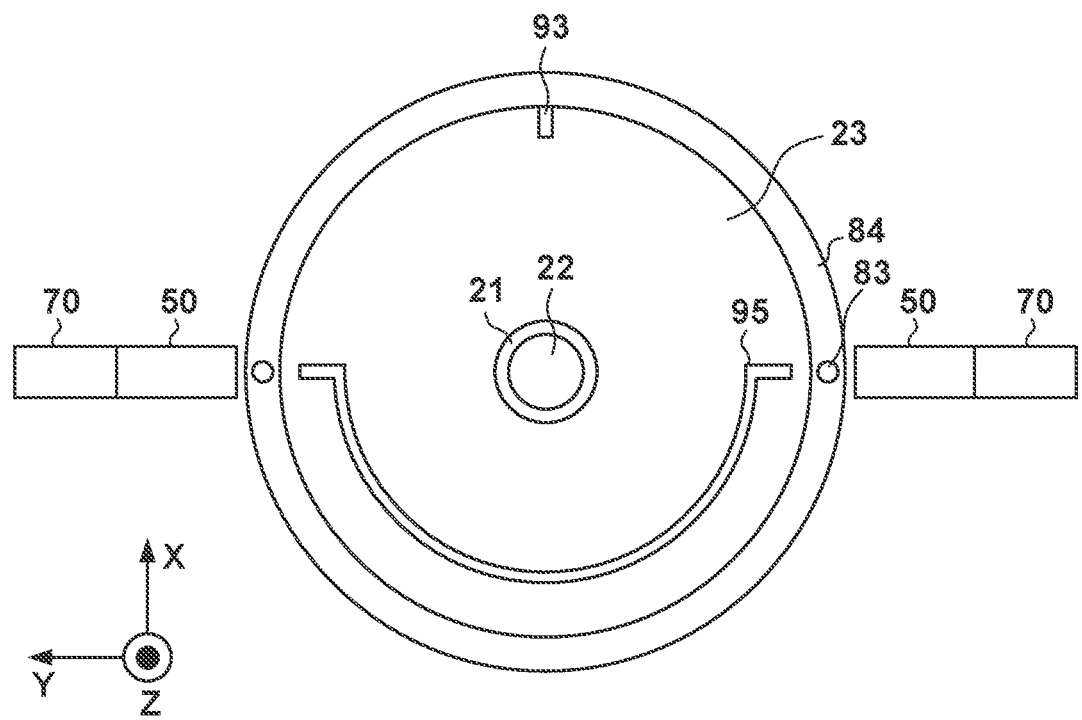
FIG. 9 is a view schematically showing the arrangement of an X-ray generation apparatus according to the sixth embodiment.

FIG. 9 schematically shows the arrangement of an X-ray generation apparatus 1 according to the sixth embodiment. Matters not mentioned as the X-ray generation apparatus 1 of the sixth embodiment can comply with the first to fourth embodiments. The X-ray generation apparatus 1 can include a mark 93 representing the pivot angle of an X-ray generation tube XG with respect to a tube support structure 60. The X-ray generation apparatus 1 may include an engaging portion 95 that engages with a jig (not shown) to pivot the X-ray generation tube XG. An operator can engage the jig with the engaging portion 95, and operate the jig, thereby pivoting the X-ray generation tube XG.

Figure 10:
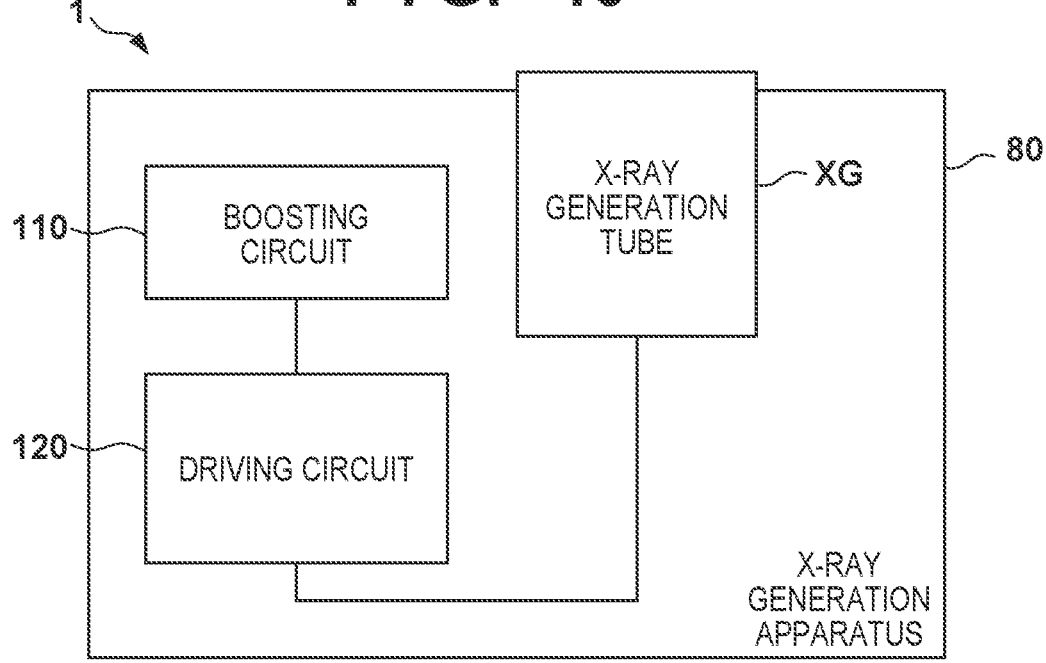
FIG. 10 is a block diagram schematically showing the arrangement of an X-ray generation apparatus according to an embodiment.

FIG. 10 shows the arrangement of an X-ray generation apparatus 1 according to an embodiment. The X-ray generation apparatus 1 can include a boosting circuit 110 and a driving circuit 120 in addition to the above-described X-ray generation tube XG. The boosting circuit 110 can generate a boosted voltage by boosting a voltage supplied from the outside, and supply the boosted voltage to the driving circuit 120. The driving circuit 120 can drive the X-ray generation tube XG based on the boosted voltage supplied from the boosting circuit 110. The X-ray generation tube XG, the boosting circuit 110, and the driving circuit 120 can be stored in a storage portion 80, and a space inside the storage portion 80 can be filled with an insulating fluid.

Figure 11:
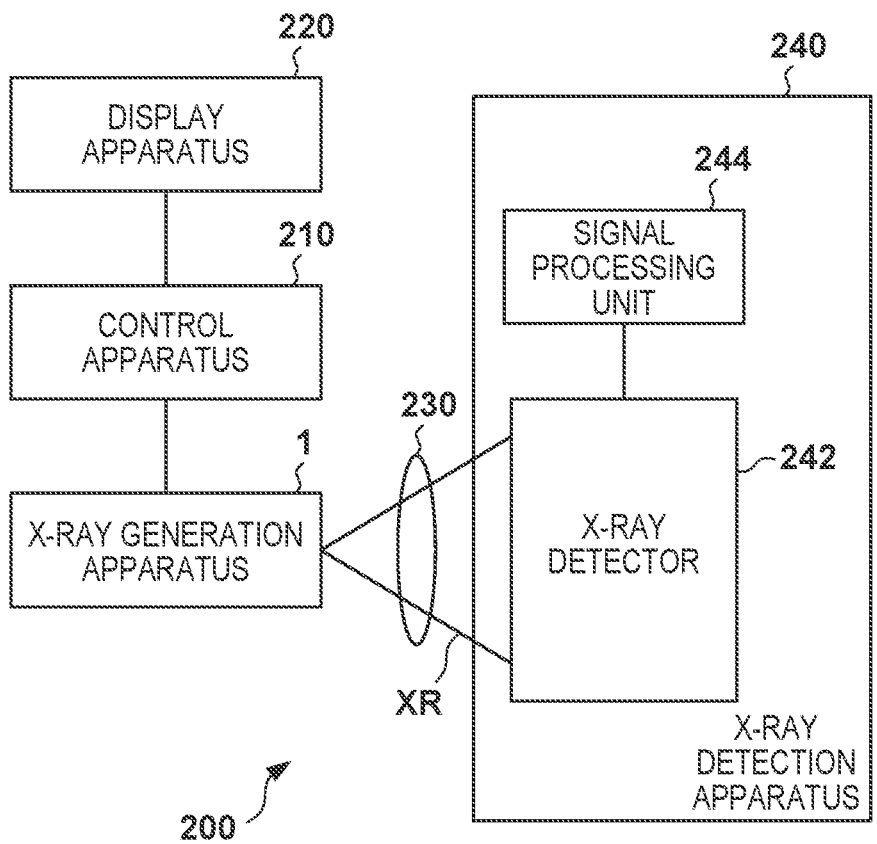
FIG. 11 is a block diagram schematically showing the arrangement of an X-ray imaging apparatus according to an embodiment.

FIG. 11 shows the arrangement of an X-ray imaging apparatus 200 according to an embodiment. The X-ray imaging apparatus 200 can include an X-ray generation apparatus 1, and an X-ray detection apparatus 240 that detects X-rays XR emitted from the X-ray generation apparatus 1 and transmitted through an object 230. The X-ray detection apparatus 240 may further include a control apparatus 210 and a display apparatus 220. The X-ray detection apparatus 240 can include an X-ray detector 242 and a signal processing unit 244. The control apparatus 210 can control the X-ray generation apparatus 1 and the X-ray detection apparatus 240. The X-ray detector 242 can detect or image the X-rays XR emitted from the X-ray generation apparatus 1 and transmitted through the object 230. The signal processing unit 244 can process a signal output from the X-ray detector 242, and supply the processed signal to the control apparatus 210. The control apparatus 210 displays an image on the display apparatus 220 based on the signal supplied from the signal processing unit 244. Based on the use amount of the X-ray generation apparatus 1 and/or the change of the X-rays generated by the X-ray generation apparatus 1, the control apparatus 210 determines whether it is necessary to execute the pivot step. If it is determined that it is necessary to execute the pivot step, the control apparatus 210 may use the display apparatus 220 to prompt an operator to execute the pivot step.

As described above, if the focus position of the X-rays (the incident position of the electron beam) emitted from the X-ray generation apparatus 1 is changed, it is necessary to align the X-ray detector 242 or the X-ray detection apparatus 240 accordingly. In the X-ray generation apparatus 1 according to each of the above-described embodiments, since it is possible to prolong the life of the target or the X-ray generation tube without changing the focus position, it is unnecessary to perform such alignment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An X-ray imaging apparatus comprising:
an X-ray generation apparatus including an X-ray generation tube that includes an electron gun and a target configured to receive an electron beam emitted from the electron gun to generate X-rays, a support structure configured to support the X-ray generation tube, and a deflector configured to deflect the electron beam;
an X-ray detector configured to detect the X-rays emitted from the X-ray generation apparatus; and
a control apparatus configured to control the X-ray generation apparatus,
wherein the support structure supports the X-ray generation tube so as to permit at least the target to be pivoted in a state in which the deflector is fixed,
the control apparatus determines, based on a use amount of the X-ray generation apparatus and/or a change of the X-rays generated by the X-ray generation apparatus, whether it is necessary to pivot the target,
the support structure includes a storage portion configured to surround the x-ray generation tube, the storage portion supporting the X-ray generation tube so as to permit the X-ray generation tube to be pivoted in the state in which the deflector is fixed, and
the deflector includes a first magnet and a second magnet that are arranged to face each other via the storage portion.

2. The X-ray imaging apparatus according to claim 1, wherein the support structure supports the X-ray generation tube so as to permit the X-ray generation tube to be pivoted in the state in which the deflector is fixed.

3. The X-ray imaging apparatus according to claim 1, wherein the support structure supports the X-ray generation tube so as to permit the X-ray generation tube to be pivoted about a pivot axis coinciding with a center axis of the electron gun.

4. The X-ray imaging apparatus according to claim 3, wherein the center axis of the electron gun passes through a center of the target.

5. The X-ray imaging apparatus according to claim 1, wherein in a case where the electron beam is not deflected by the deflector, the electron beam enters the center of the target.

6. The X-ray imaging apparatus according to claim 1, wherein the X-ray generation apparatus further includes an electrode configured to apply a potential to the target, and an O-ring is arranged between the storage portion and the electrode of the X-ray generation tube.

7. The X-ray imaging apparatus according to claim 6, wherein an insulating fluid is arranged in a space between the X-ray generation tube and the storage portion.

8. The X-ray imaging apparatus according to claim 7, further comprising an O-ring,
wherein the X-ray generation tube and the storage portion have seal surfaces facing each other via the O-ring.

9. The X-ray imaging apparatus according to claim 1, further comprising an O-ring arranged between the X-ray generation tube and the storage position.

10. The X-ray imaging apparatus according to claim 1, wherein the X-ray generation tube includes a mark representing a pivot angle of the X-ray generation tube with respect to the support structure.

11. An adjustment method of an X-ray generation apparatus including an X-ray generation tube that includes an electron gun and a target configured to receive an electron beam emitted from the electron gun to generate X-rays, a support structure configured to support the X-ray generation tube, and a deflector configured to deflect the electron beam, the method comprising:
- a pivot step of pivoting at least the target, in a state in which the deflector is fixed, in accordance with a use amount of the X-ray generation apparatus and/or a change of the X-rays generated by the X-ray generation apparatus,
- wherein the support structure includes a storage portion configured to surround the X-ray generation tube, and in the pivot step, the X-ray generation tube is pivoted in a state in which the deflector and the storage portion are fixed, and
- the deflector includes a first magnet and a second magnet that are arranged to face each other via the storage portion.

12. The adjustment method of the X-ray generation apparatus according to claim 11, wherein in the pivot step, the X-ray generation tube is pivoted in the state in which the deflector is fixed.

13. The adjustment method of the X-ray generation apparatus according to claim 11, wherein in the pivot step, the X-ray generation tube is pivoted about a pivot axis coinciding with a center axis of the electron gun.

14. The adjustment method of the X-ray generation apparatus according to claim 13, wherein the center axis of the electron gun passes through a center of the target.

15. The adjustment method of the X-ray generation apparatus according to claim 11, wherein in a case where the electron beam is not deflected by the deflector, the electron beam enters the center of the target.

16. The adjustment method of the X-ray generation apparatus according to claim 11, wherein
- an insulating fluid is arranged in a space between the X-ray generation tube and the storage portion, and
- the pivot step is performed while the insulating fluid is maintained in the space between the X-ray generation tube and the storage portion.

17. The adjustment method of the X-ray generation apparatus according to claim 16, wherein
- an O-ring is arranged between the X-ray generation tube and the storage portion, and
- the pivot step is performed while seal by the O-ring is maintained.

18. An X-ray generation apparatus comprising:
- an X-ray generation tube including an electron gun and a target configured to receive an electron beam emitted from the electron gun to generate X-rays;
- a support structure configured to support the X-ray generation tube;
- a deflector configured to deflect the electron beam,
- a control apparatus configured to control the X-ray generation apparatus,
- wherein the target has a circular shape, and is formed from a single metal or a single alloy,
- the support structure supports the X-ray generation tube so as to permit at least the target to be pivoted about a pivot axis coinciding with a center axis of the electron gun in a state in which the deflector is fixed,
- the control apparatus determines, based on a use amount of the X-ray generation apparatus and/or a change of the X-rays generated by the X-ray generation apparatus, whether it is necessary to pivot the target,
- the support structure includes a storage portion configured to surround the X-ray generation tube, the storage portion supporting the X-ray generation tube so as to permit the X-ray generation tube to be pivoted in the state in which the deflector is fixed, and
- the deflector includes a first magnet and a second magnet that are arranged to face each other via the storage portion.

19. The X-ray generation apparatus according to claim 18, wherein the center axis of the electron gun is arranged to pass through a center of the target.

20. The X-ray generation apparatus according to claim 18, wherein the electron beam enters a center of the target in a case where the electron beam is not deflected by the deflector.

21. The X-ray imaging apparatus according to claim 18, wherein the X-ray generation apparatus further includes an electrode configured to apply a potential to the target, and an O-ring is arranged between the storage portion and the electrode of the X-ray generation tube.

22. The X-ray imaging apparatus according to claim 18, wherein an insulating fluid is arranged in a space between the X-ray generation tube and the storage portion.

23. The X-ray imaging apparatus according to claim 22, further comprising an O-ring,
- wherein the X-ray generation tube and the storage portion have seal surfaces facing each other via the O-ring.

24. The X-ray imaging apparatus according to claim 18, further comprising an O-ring arranged between the X-ray generation tube and the storage portion.

25. The X-ray imaging apparatus according to claim 18, wherein the X-ray generation tube includes a mark representing a pivot angle of the X-ray generation tube with respect to the support structure.

* * * * *